(12) United States Patent
Feick et al.

(10) Patent No.: US 7,806,681 B2
(45) Date of Patent: Oct. 5, 2010

(54) PLATE HEATER FOR A MANIFOLD OF AN INJECTION MOLDING APPARATUS

(75) Inventors: Murray Feick, Kitchener (CA); Douglas Ursu, Orangeville (CA)

(73) Assignee: Mold-Masters (2007) Limited, Georgetown, Ontario (CA)

( * ) Notice: Subject to any disclaimer, the term of this patent is extended or adjusted under 35 U.S.C. 154(b) by 229 days.

(21) Appl. No.: 12/279,537

(22) PCT Filed: Feb. 15, 2007

(86) PCT No.: PCT/CA2007/000226

§ 371 (c)(1),
(2), (4) Date: Aug. 14, 2008

(87) PCT Pub. No.: WO2007/093052

PCT Pub. Date: Aug. 23, 2007

(65) Prior Publication Data

US 2009/0269435 A1    Oct. 29, 2009

Related U.S. Application Data

(63) Continuation-in-part of application No. 11/354,416, filed on Feb. 15, 2006, now abandoned.

(51) Int. Cl.
*B29C 45/74* (2006.01)
(52) U.S. Cl. ........................ 425/547; 425/572
(58) Field of Classification Search .......... 425/547, 425/548, 572
See application file for complete search history.

(56) References Cited

U.S. PATENT DOCUMENTS

| | | |
|---|---|---|
| 2,890,318 A | 6/1959 | Kruse |
| 3,387,653 A | 6/1968 | Coe |
| 4,401,885 A | 8/1983 | Ishii et al. |
| 4,438,325 A | 3/1984 | Gellert |
| 4,439,915 A | 4/1984 | Gellert |
| 4,500,279 A | 2/1985 | Devellian et al. |
| 4,648,546 A | 3/1987 | Gellert |
| 4,688,622 A | 8/1987 | Gellert |
| 4,892,474 A | 1/1990 | Gellert |
| 5,007,821 A | 4/1991 | Schmidt |
| 5,032,078 A | 7/1991 | Benenati |
| 5,096,411 A | 3/1992 | Gellert |

(Continued)

FOREIGN PATENT DOCUMENTS

CH    549 327    5/1974

(Continued)

OTHER PUBLICATIONS

"FL/FLM Anlageheizkorper Flat Heater", *Turk & Hillinger Elektrowarme Brochure*.

*Primary Examiner*—Tim Heitbrink
(74) *Attorney, Agent, or Firm*—Medler Ferro PLLC

(57) ABSTRACT

An injection molding apparatus includes a manifold having a manifold channel for receiving a melt stream of moldable material and delivering the melt stream to a mold cavity through a nozzle channel of a nozzle and a mold gate. A heater is coupled to the manifold. The heater includes a heater plate that is formed by an extrusion process and at least one channel for receiving a heating element.

20 Claims, 20 Drawing Sheets

U.S. PATENT DOCUMENTS

| | | |
|---|---|---|
| 5,227,179 A | 7/1993 | Benenati |
| 5,503,545 A * | 4/1996 | Benenati .................... 425/572 |
| 5,539,857 A | 7/1996 | McGrevy |
| 5,569,474 A | 10/1996 | Kitaichi et al. |
| 5,591,366 A | 1/1997 | Schmidt et al. |
| 5,639,489 A | 6/1997 | Van Boekel |
| 5,645,867 A | 7/1997 | Crank et al. |
| 6,250,911 B1 | 6/2001 | Schwarzkopf |
| 6,405,785 B1 | 6/2002 | Gellert et al. |
| 6,447,283 B1 | 9/2002 | Gellert |
| 6,544,027 B2 * | 4/2003 | Yu ............................ 425/570 |
| 6,575,729 B2 | 6/2003 | Godwin et al. |
| 6,619,948 B2 | 9/2003 | Gunther |
| 6,749,422 B2 * | 6/2004 | Yu ............................ 425/572 |
| 2004/0258792 A1 | 12/2004 | Olaru et al. |

FOREIGN PATENT DOCUMENTS

| | | |
|---|---|---|
| DE | 1 765 768 | 8/1971 |
| DE | 197 42 101 C2 | 12/1999 |
| DE | 201 18 050 U1 | 2/2002 |
| EP | 0 681 899 A2 | 11/1995 |
| EP | 1 352 727 A2 | 10/2003 |
| EP | 1 366 883 A1 | 12/2003 |
| WO | WO-01/54878 A1 | 8/2001 |
| WO | WO-2004/069517 A1 | 8/2004 |
| WO | WO-2007/093052 A1 | 8/2007 |

* cited by examiner

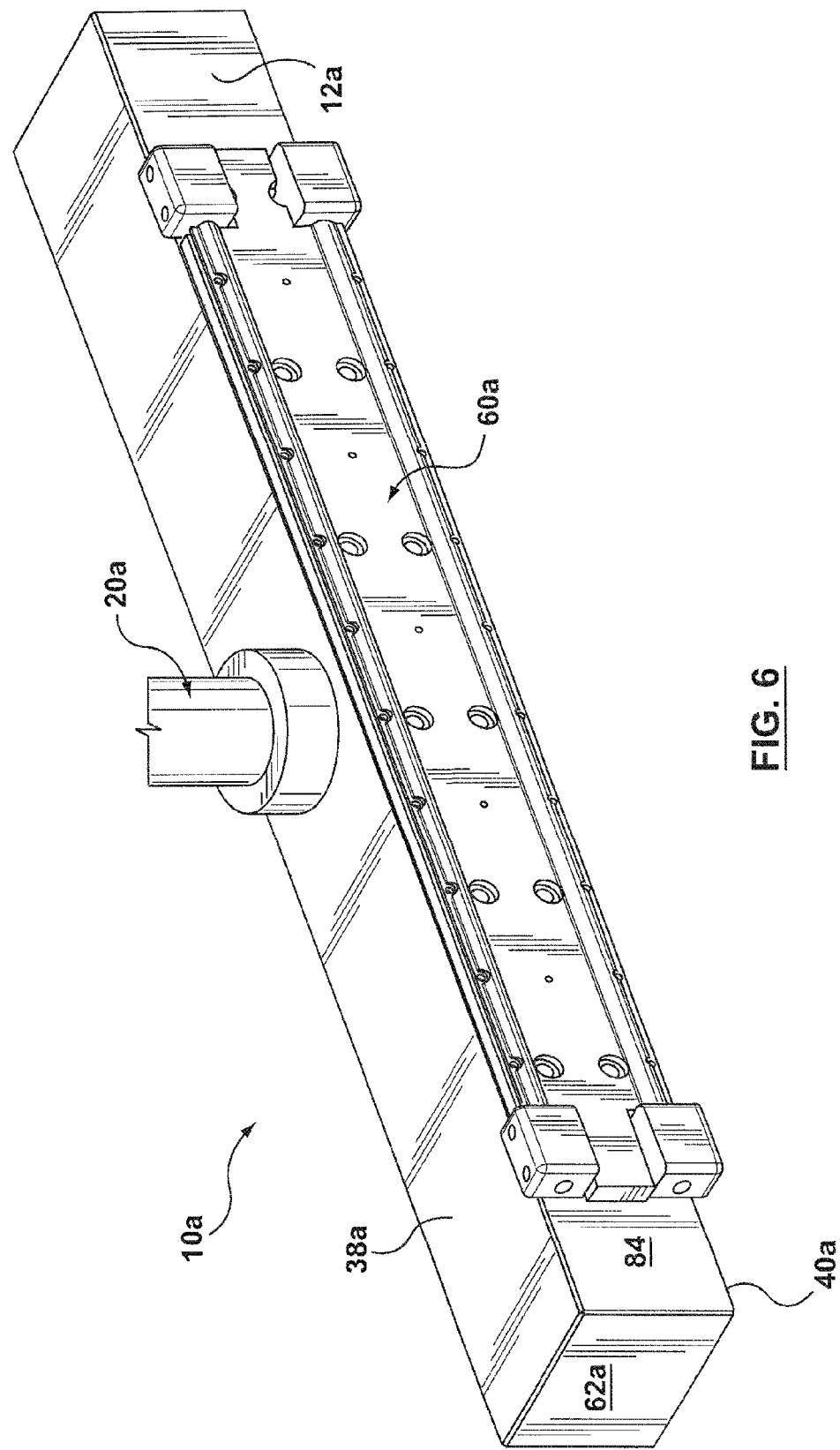

PLATE HEATER FOR A MANIFOLD OF AN INJECTION MOLDING APPARATUS

FIELD OF THE INVENTION

The present invention relates generally to an injection molding apparatus and, in particular to a plate heater for a manifold.

BACKGROUND OF THE INVENTION

As is well known in the art, a typical multi-cavity hot runner injection molding system includes a heated manifold for conveying a pressurized melt stream from an inlet to a plurality of outlets. A heated nozzle communicates with each outlet to deliver the melt to a respective mold cavity through a mold gate. Manifolds have various configurations depending on the number and arrangement of the mold cavities.

Different heating arrangements are known for heating manifolds. A common arrangement is an electrical heating element that is received in a groove in a manifold outer surface, as described in U.S. Pat. No. 4,688,622 to Gellert, which issued Aug. 25, 1987. Other arrangements include cartridge heaters that are cast into the manifold as described in U.S. Pat. No. 4,439,915 to Gellert, which issued Apr. 3, 1984, and plate heaters with cast-in heaters that are secured along the surface of the manifold, as described in U.S. Pat. No. 5,007,821 to Schmidt, which issued Apr. 16, 1991. Manufacture and assembly of each of these heating arrangements requires machining of the manifold, the heater or both, which can be both costly and time consuming.

For certain large molded parts that require melt delivered from large heated manifolds, the melt stream is heated by either multiple smaller heater plates attached to the manifold or heater elements pressed within grooves machined into the manifold surface. Each of these solutions has its benefits and limitations.

Heater plates provide more consistent heat distribution than a heater element in contact with the manifold surface. Further, heater plates may include more than one heater element allowing for redundancy. However, heater plates are typically made by investment casting methods, which does not accommodate the manufacture of larger plates due to warpage and bending that occurs as the plates get longer. Therefore, multiple shorter plates, i.e., plates typically less than 170 mm, are utilized for larger manifold applications, which require more control zones to operate. Further, heater elements of current heater plates are cast within the heater plate and cannot be replaced once they fail, so that the entire heater plate must be replaced upon failure of the heater elements therein.

Alternatively, heater elements that are pressed-in machined grooves on the surface of a manifold may be removed for replacement, although machining such grooves is time consuming and expensive. In addition, redundancy is provided for by machining a corresponding groove in an opposing surface of the manifold and pressing a secondary heater element into the second groove, adding to the time and cost associated with this production method.

Accordingly, what is needed is a manifold heater arrangement that provides the improved heat distribution and redundancy of a heater plate and provides for replacement of failed heater elements and fewer control zones. In addition, a heater plate that may be efficiently constructed, particularly at longer sizes, is desired.

SUMMARY OF THE INVENTION

According to an embodiment of the present invention there is provided an injection molding apparatus including a heated manifold with a melt channel for transferring molten material from an injection molding machine to one or more hot runner nozzles which in turn inject the molten material to one of more cooled mold cavities to form a plastic part. One or more heaters are connected to the manifold in a configuration to provide heat to maintain the temperature of the molten material throughout the entire length of the melt channels in the manifold. The plate heater includes a heater plate body and at least two heating elements. A surface of the heater plate body has at least two channels therein and each heating element is received within a respective channel. At least one end cap is provided for commonly fixing terminal ends of at least two of the heating elements relative to the heater plate body.

Another embodiment of the present invention includes a method of manufacturing a plate heater for a hot runner manifold. The method includes providing an extruded bar like blank having at least two straight longitudinal grooves therein; planning a flat contact face of the blank; machining the grooves to fine forming straight longitudinal channels in the blank to gain a heater plate body; inserting longitudinal heating elements into the longitudinal channels in the heater plate body.

Further advantageous embodiments are defined in the dependent claims.

BRIEF DESCRIPTION OF THE FIGURES

Embodiments of the present invention will now be described more fully with reference to the accompanying drawings in which like reference numerals indicate similar structure. The drawings are not to scale.

FIG. 6 is an isometric view of an injection molding apparatus according to another embodiment of the present invention.

DETAILED DESCRIPTION OF THE INVENTION

Figure 1:
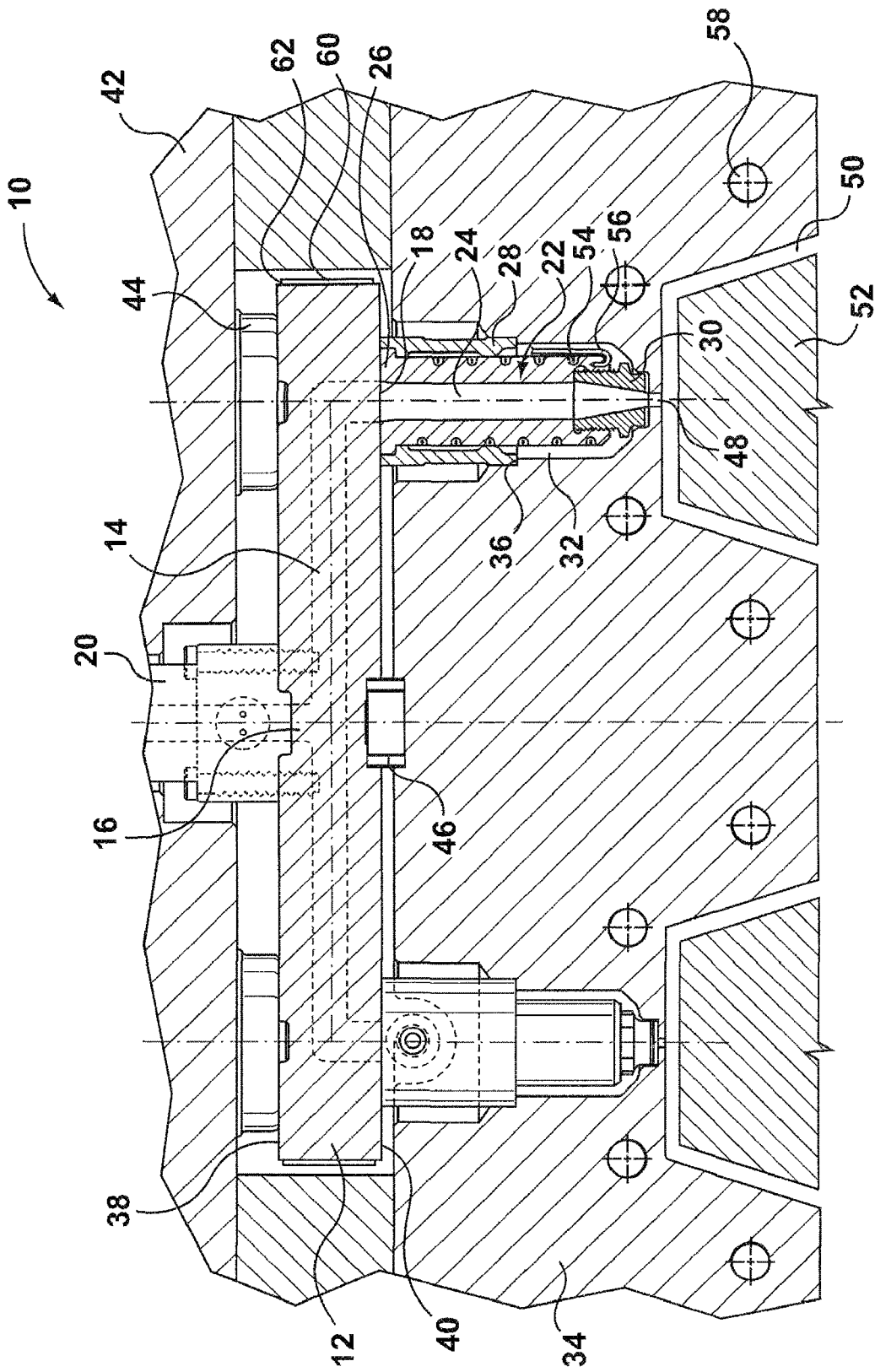
FIG. 1 is a side sectional view of an injection molding apparatus according to an embodiment of the present invention.

Referring now to FIG. 1, an injection molding apparatus 10 is generally shown. Injection molding apparatus 10 includes a manifold 12 having a manifold melt channel 14. Manifold melt channel 14 extends from an inlet 16 to manifold outlets 18. Inlet 16 of manifold melt channel 14 receives a melt stream of moldable material from a machine nozzle (not shown) through a sprue bushing 20 and delivers the melt to hot runner nozzles 22, which are in fluid communication with respective manifold outlets 18. Although a pair of hot runner nozzles 22 is shown in FIG. 1, it will be appreciated that a typical injection molding apparatus may include only one or a plurality of hot runner nozzles for receiving melt from respective manifold outlets.

Each hot runner nozzle 22 is received in an opening 32 in a mold plate 34. A collar 28 surrounds the nozzle 22. The collar 28 abuts a step 36, which is provided in opening 32 to maintain a nozzle head 26 of the hot runner nozzle 22 in abutment with an outlet surface 40 of manifold 12. A nozzle tip 30 is received in a downstream end of hot runner nozzle 22 and may be threaded thereto. A nozzle melt channel 24 extends through hot runner nozzle 22 and nozzle tip 30. Nozzle melt channel 24 is in communication with manifold outlet 18 to receive melt from manifold channel 14. Hot runner nozzle 22 is heated by a heater 54 and further includes a thermocouple 56.

A mold cavity 50 is provided between mold plate 34 and a mold core 52. Mold cavity 50 receives melt from nozzle melt channel 24 through a mold gate 48. Cooling channels 58 extend through mold plate 34 to cool mold cavity 50.

Figure 2:
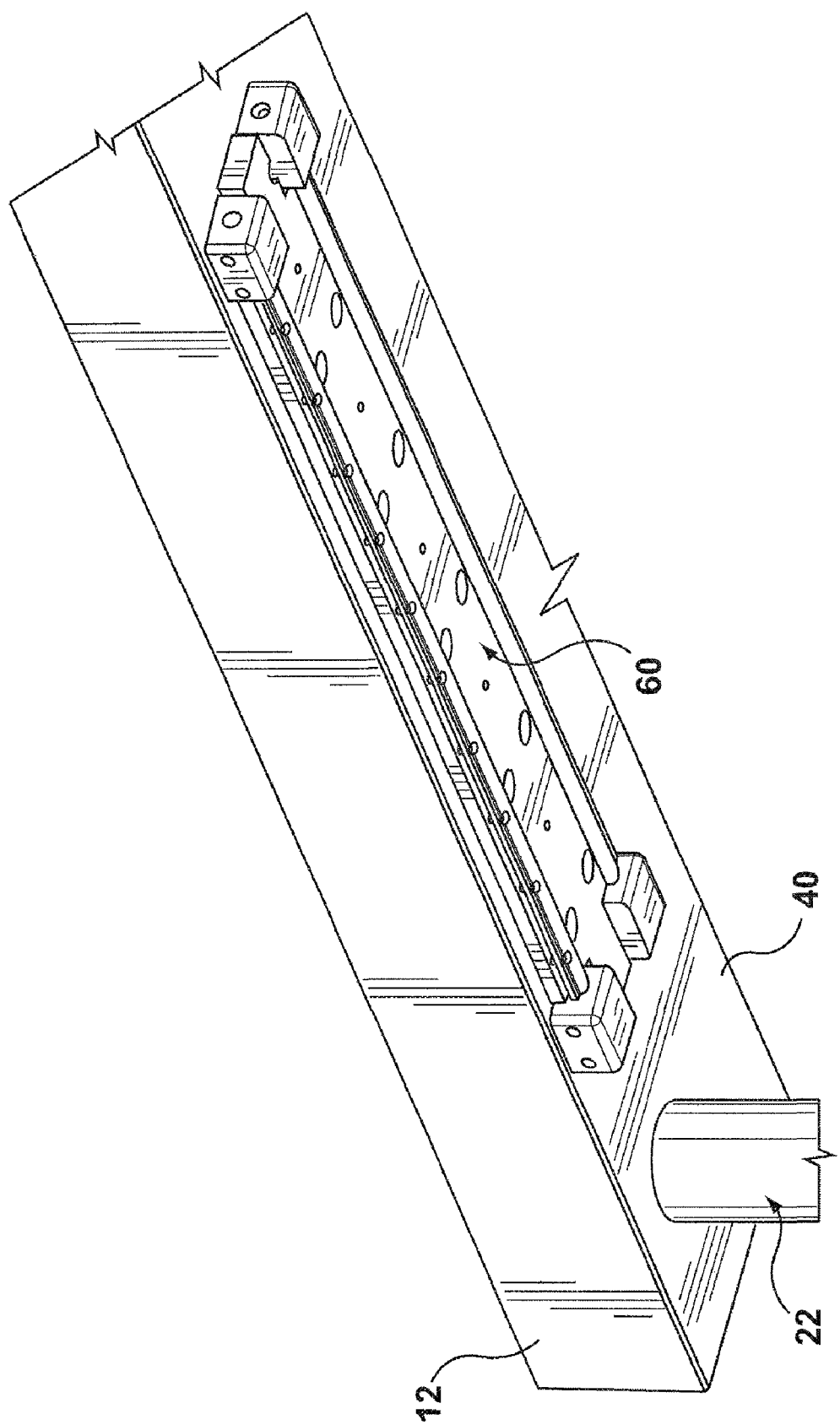
FIG. 2 is an isometric view of a portion of the injection molding apparatus of FIG. 1.

Manifold 12 is maintained in position relative to mold plate 34 by a locating ring 46. Spacers 44 are provided between an inlet surface 38 of manifold 12 and a back plate 42. Referring also to FIG. 2, manifold 12 is heated by heaters 60, which are coupled to the outlet surface 40 and side surfaces 62 of the manifold 12.

Figure 3:
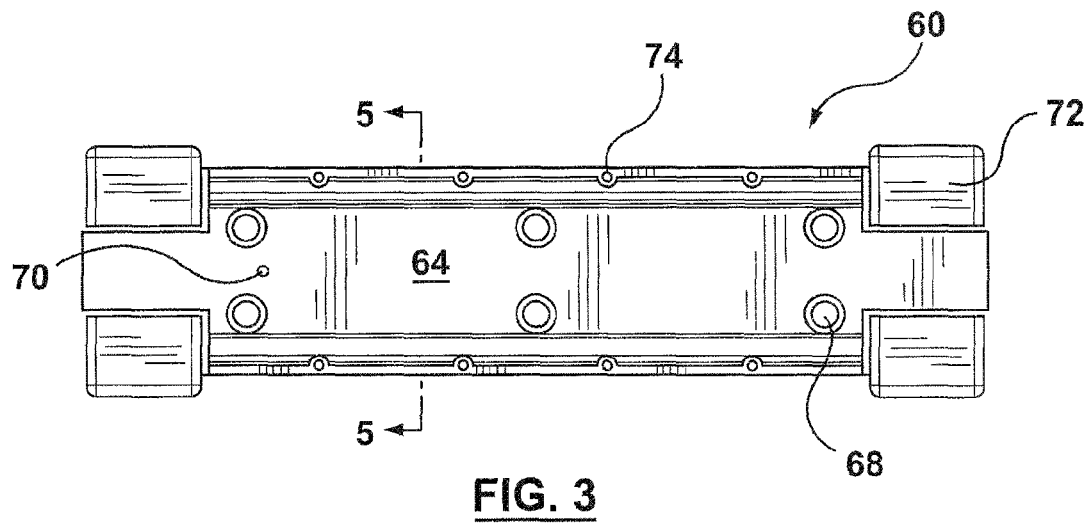
FIG. 3 is a top view of a plate heater of the injection molding apparatus of FIG. 2.
Figure 4:
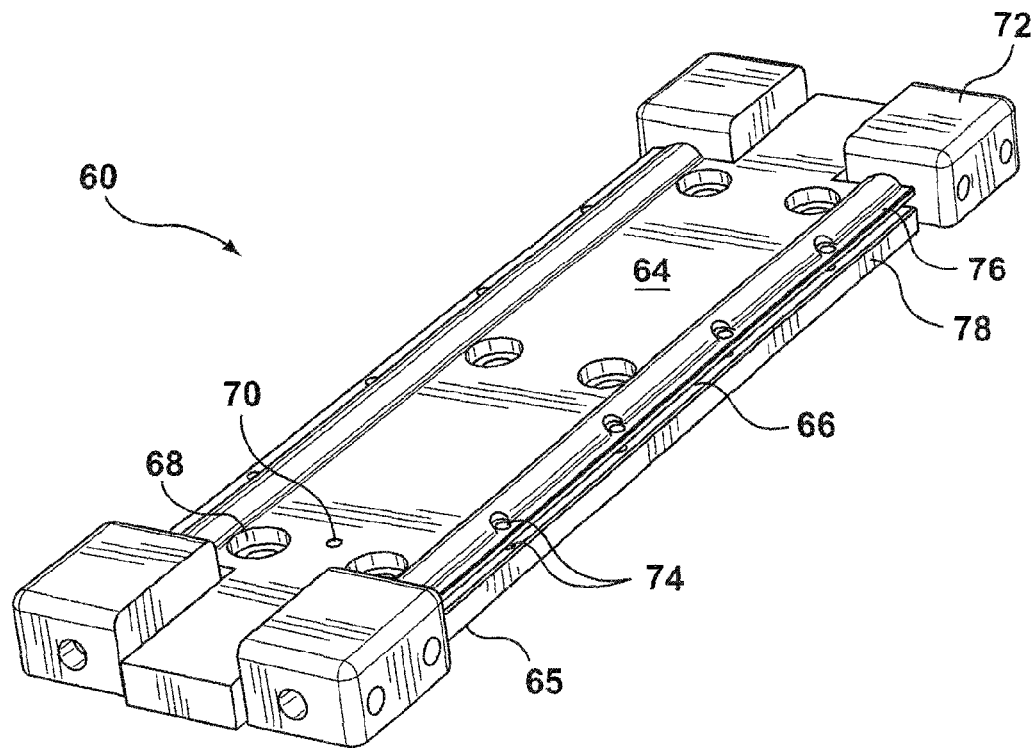
FIG. 4 is an isometric view of the heater of FIG. 3.
Figure 5:
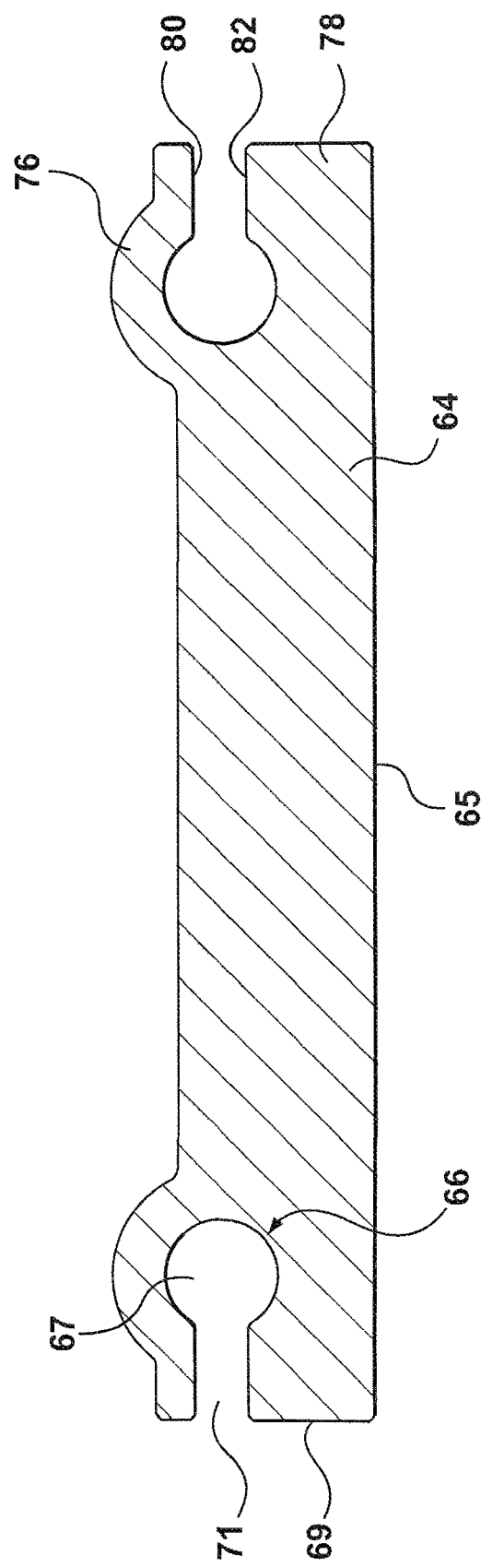
FIG. 5 is a cross-section along line 5-5 of the heater plate of FIG. 3 with the heating elements removed.

As shown in FIGS. 3-5, each plate heater 60 includes a heater plate body 64 having flange portions 76 and base portions 78 that define a pair of channels 66 therebetween. Each channel 66 extends within a respective side surface 69 of heater plate 64. Although heater plate body 64 is shown having a pair of channels 66, the heater plate body 64 may be adapted to alternatively include one channel 66 or a plurality of channels 66.

The heater plate body 64 is formed by an extrusion process, as described below, from a material that is more thermally conductive than the manifold 12, which is typically made from tool steel such as H13, P20 or SS420, for example. Suitable thermally conductive materials for heater plate body 64 include aluminum, aluminum alloys, copper and copper alloys, such as brass and bronze. Alternatively, another suitable material may be used.

Channels 66 of heater plate body 64 are shaped and sized to receive and secure heating elements (not shown) therein. As illustrated in FIG. 5, a cross-section of channel 66 may be described as key-shaped or bulb-shaped having a narrowed neck portion 71 and an enlarged cavity portion 67. In one embodiment, neck portion 71 is narrower than a heating element to be seated in cavity portion 67, wherein cavity portion 67 is sized to securely receive the heating element. Flange portions 76, which form the upper surface of channels 66, and base portions 78, which form the lower surface of channels 66, include heating element retaining holes 74 for receiving fasteners (not shown) that force a mating surface 80 of flange portion 76 toward a surface 82 of base portion 78 to impart a clamping force on the heating element. The clamping force increases the amount of contact, and therefore heat transfer, between the heating element and the heater plate body 64.

The plate heater 60 further includes relief holes 68, which are located at regular intervals along the length of the heater plate body 64. The relief holes 68 are provided to receive mechanical items, including fasteners (not shown), for coupling the plate heater 60 to the manifold 12. A thermocouple aperture 70 extends through heater plate body 64 and receives a thermocouple (not shown). Connectors 72, which allow the heating elements to communicate with a power source (not shown), are coupled to the free ends of each of the heating elements. The heating elements may be powered independently, in parallel or in series. By powering the heating elements independently or in parallel, a fail-safe, redundant arrangement is provided in which one plate heater will continue to provide heat even if the other heating element fails. In an embodiment where independent control of each heating element is provided, an additional control zone and thermocouple are utilized. However in accordance with the present invention, regardless of how the plate heater is operated, the heating element(s) may be accessed for replacement simply by removing the fasteners from retaining holes 74 and exposing/removing the heating element from channel 66.

In operation, melt is injected from the machine nozzle into manifold channel 14 of manifold 12 through sprue bushing 20. Nozzle melt channels 24 of nozzles 22 receive melt from manifold outlets 18 and deliver the melt to mold cavities 50 through mold gates 48. Plate heaters 60 provide heat to the manifold 12 so that the melt flowing through the manifold channel 14 is maintained at a desired temperature. Once the mold cavities 50 have been filled with melt, the melt is cooled and the molded parts are ejected from injection molding apparatus 10.

Figure 5A:
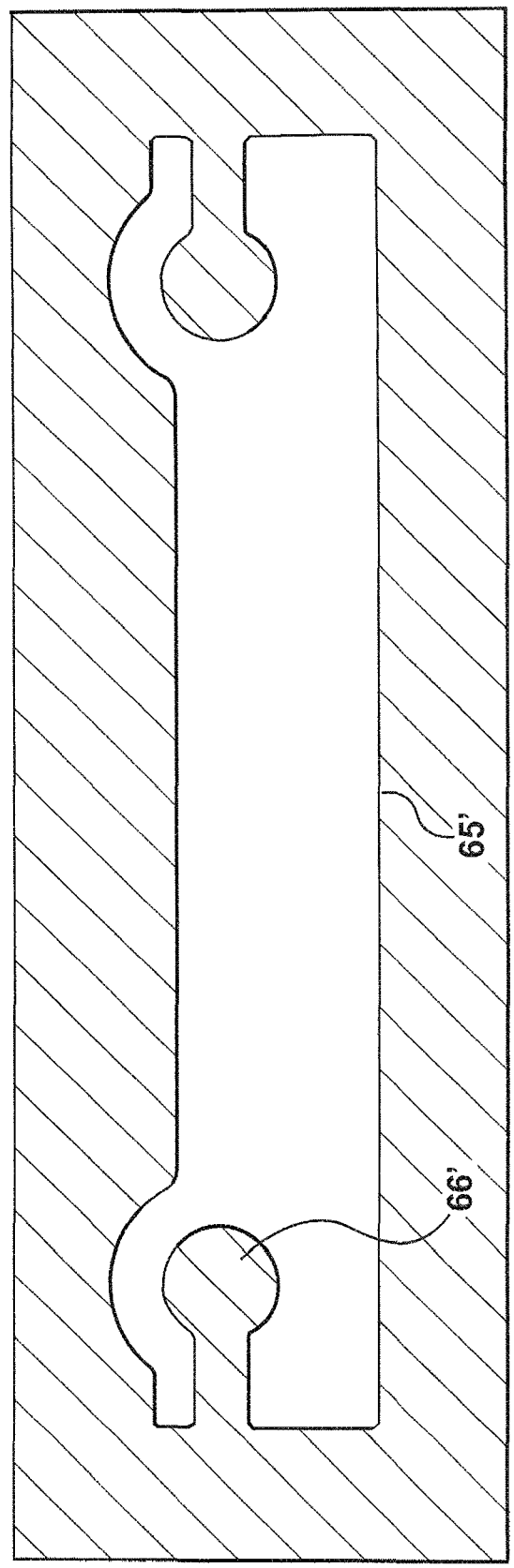
FIG. 5A is a profile of an extruder die used to produce the cross-section of the heater plate body shown in FIG. 5.

Production of the heater plate body 64 will now be described. A billet of a selected material in a raw form is pushed through a die incorporating the profile shown in FIG. 5A, to produce a heater plate having the cross-section shown in FIG. 5. The die profile includes a linear portion 65', which corresponds to a contact surface 65 on the heater plate body 64, and at least one extended portion 66', which corresponds to channel 66 of the heater plate 64. The heater plate body 64 is manufactured using an extrusion process, which includes cold-working the initial extruded form. The cold-working of the extruded plate makes it harder and stiffer than its cast counterpart, allowing for improved performance with less warpage and bending. As such, a longer extruded heater plate body that is flatter and straighter than a plate produced by a casting process, for example, is achieved.

In one embodiment, a single extruded heater plate body may be later cut to produce a plurality of custom length heater plate bodies 64. Accordingly, following extrusion, heater plate body 64 is cut to a desired length, which is determined by the surface 40, 62 of the manifold 12 to which the plate heater 60 is to be coupled. Also following extrusion, contact surface 65 of the heater plate body 64 may be machined by a machining process such as milling or grinding, for example, in order to smooth out any imperfections resulting from the extrusion process. Machining of the contact surface 65 maximizes the amount of contact between the contact surface 65 and the surfaces 40, 62 of the manifold 12 and therefore optimizes heat transfer therebetween. Relief holes 68 and thermocouple holes 70 are also machined into the heater plate body 64. Following machining, the heating elements are positioned in the channels 66 and the fasteners are installed to clamp the heating elements in position. Once assembled, the plate heater 60 is coupled to the manifold 12 and the heating elements are linked to the power source.

The heating elements are removable from the channel 66 by unscrewing the fasteners to release the clamping pressure on the heating elements. The manner in which the heating elements are secured allows them to be replaced by an operator in the event that one or both of the heating elements needs to be repaired or replaced. As such, the entire plate heater 60 does not need to be scrapped and replaced when one or more heating elements fail, which provides a cost savings.

The plate heater 60 further provides some flexibility in that channels 66 accommodate heating elements having different diameters. In applications where heating elements having smaller diameters are installed, it may be desirable to fill any gaps between the heating element and the channel 66 with a thermally conductive paste. The thermally conductive paste does not affect the removal of the heating elements 90 from the channels 66 and breaks away when the heating elements are removed.

Referring to FIG. 6, an injection molding apparatus 10*a* includes a manifold 12*a* having a plate heater 60*a*, which is similar to plate heater 60 of FIGS. 1-5. The plate heater 60*a* is coupled to a front surface 84 of the manifold 12*a*. As shown, the plate heater 60*a* is the only primary source of heat for the manifold 12*a*. In another embodiment, the plate heater 60*a* may be provided in combination with additional plate heaters on the outlet and side surfaces 40*a* and 62*a* of the manifold 12*a*, as shown in FIG. 1. The plate heater 60*a* may alternatively be provided in combination with a heater located on inlet surface 38*a*, adjacent to sprue bushing 20*a*. The plate heater 60*a* may also be paired with another manifold heating method known in the art, such as an embedded heating element, a cartridge heater or a film heater, for example. Operation of plate heater 60*a* is similar to operation of plate heater 60 of the previous embodiment and therefore will not be described further here.

Figure 7:
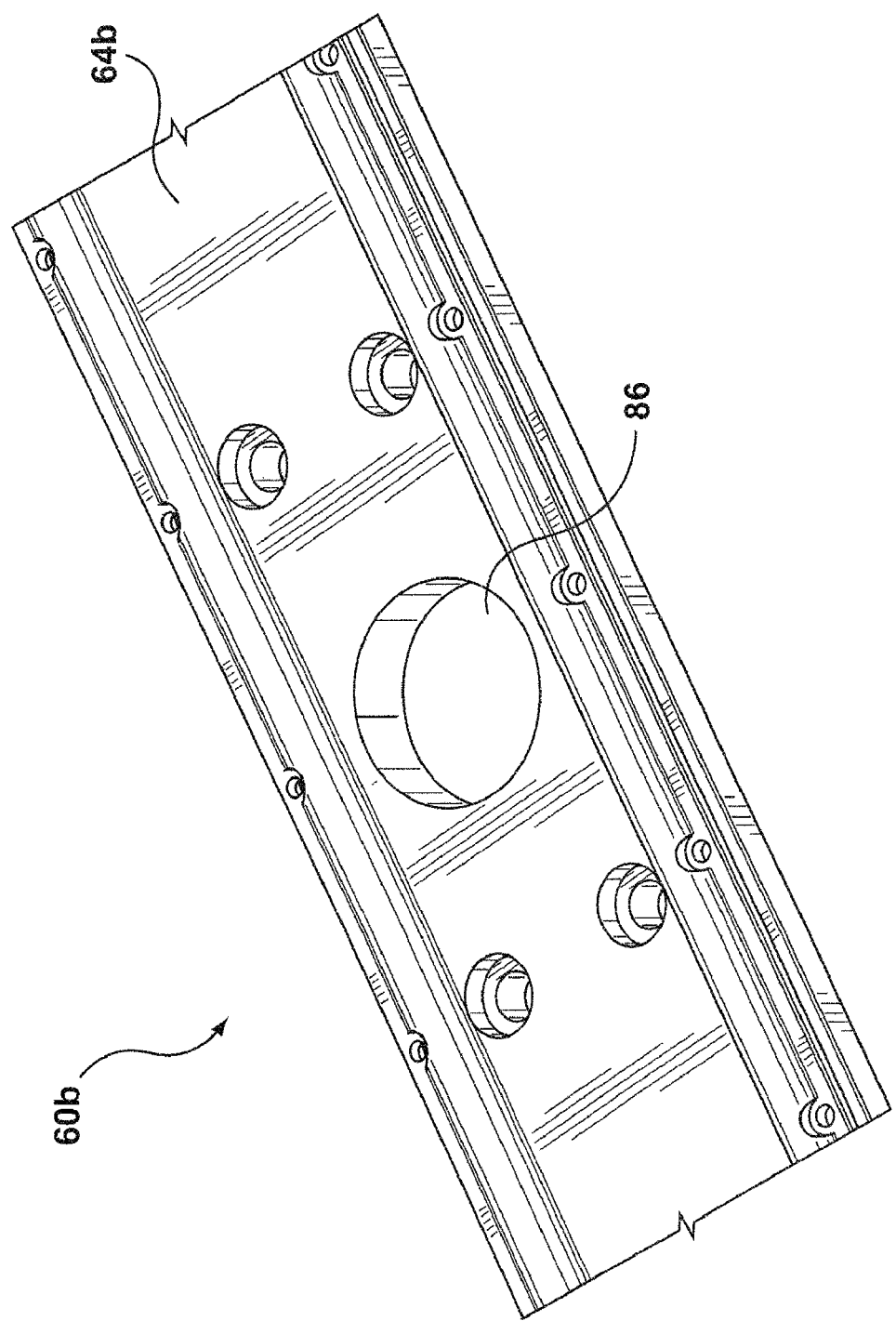
FIG. 7 is an isometric view of a plate heater according to another embodiment of the present invention.

FIG. 7 shows another embodiment of a plate heater 60*b* for heating a manifold. Plate heater 60*b* is similar to the heaters 60, 60*a* of the previous embodiments; however, plate heater 60*b* includes a central aperture 86, which extends through plate heater 64*b*. The central aperture 86 is provided in order to allow a melt transporting, manifold supporting or manifold locating component to pass therethrough. The type of component is determined by the location of the plate heater 60*b* on the manifold. For example, if the plate heater 60*b* is located on an inlet surface of the manifold, a sprue bushing may extend through the central aperture 86, whereas if the plate heater 60*b* is located on an outlet surface of the manifold, a nozzle may extend through the central aperture 86. Incorporating the central aperture 86 into the plate heater 60*b* increases the number of different locations at which the plate heater 60*b* may be coupled to the manifold.

Figure 8:
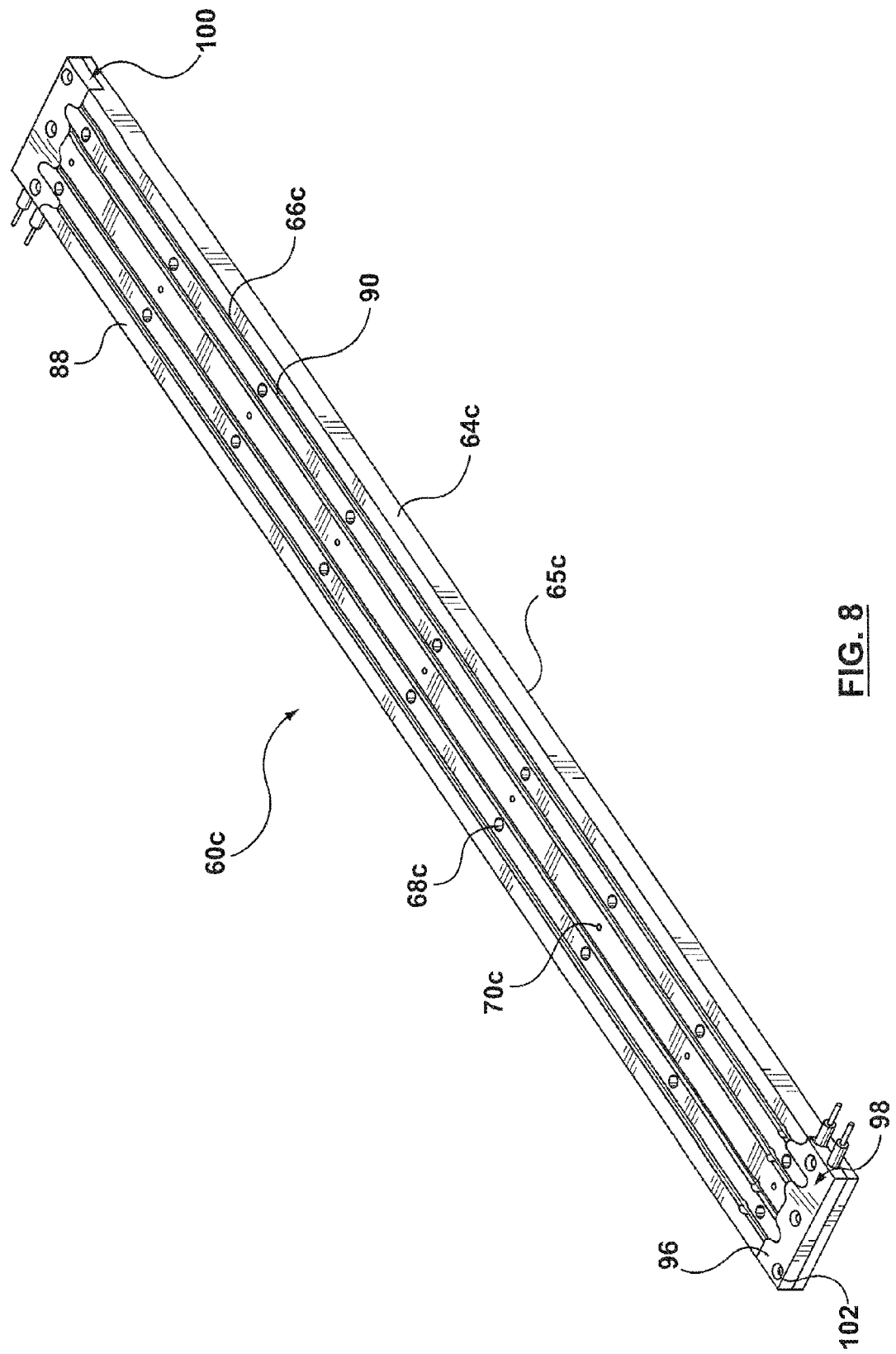
FIG. 8 is an isometric view of a plate heater according to another embodiment of the present invention.
Figure 9:
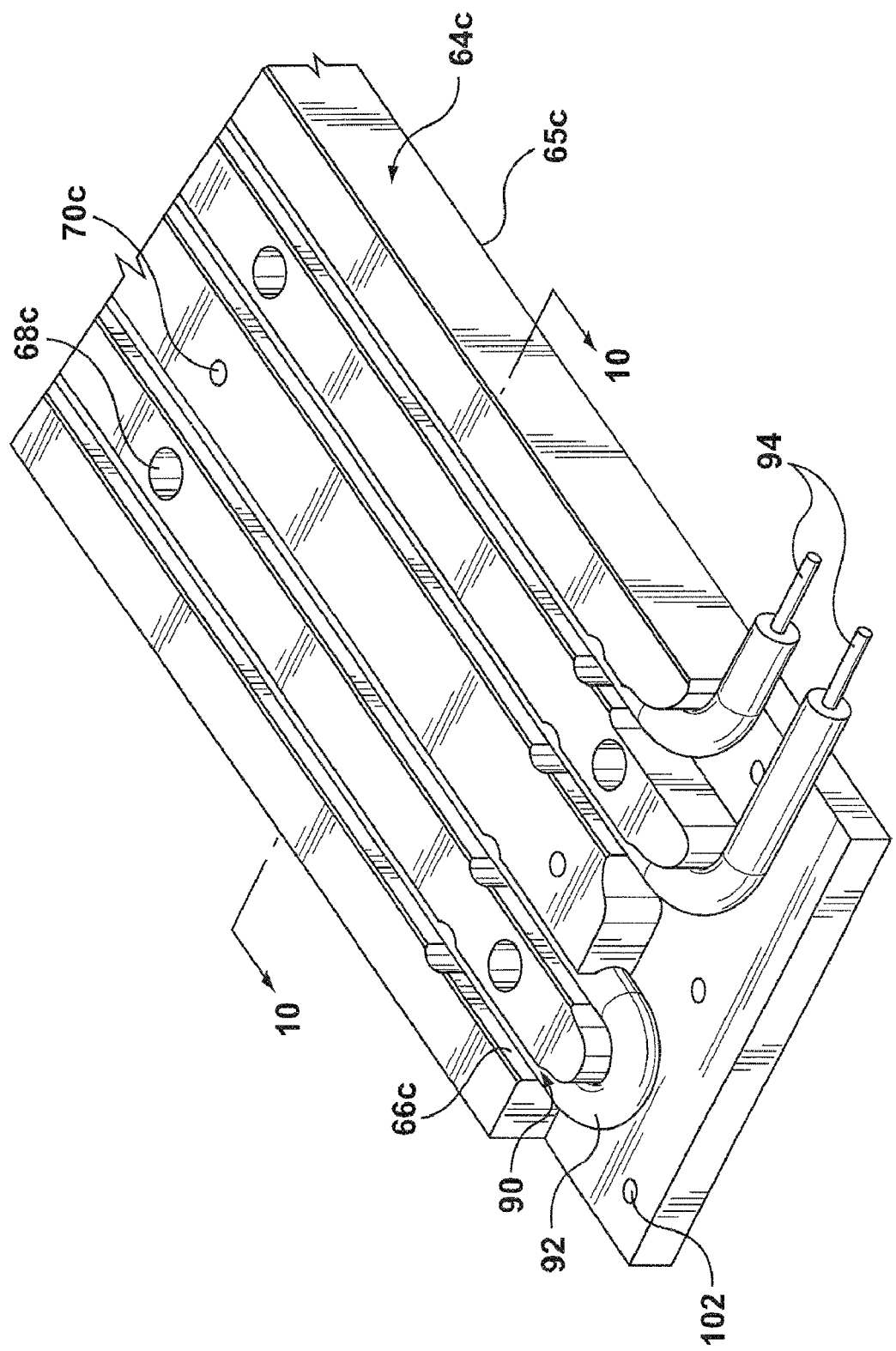
FIG. 9 is an isometric view of a portion of the plate heater shown in FIG. 8.
Figure 10:
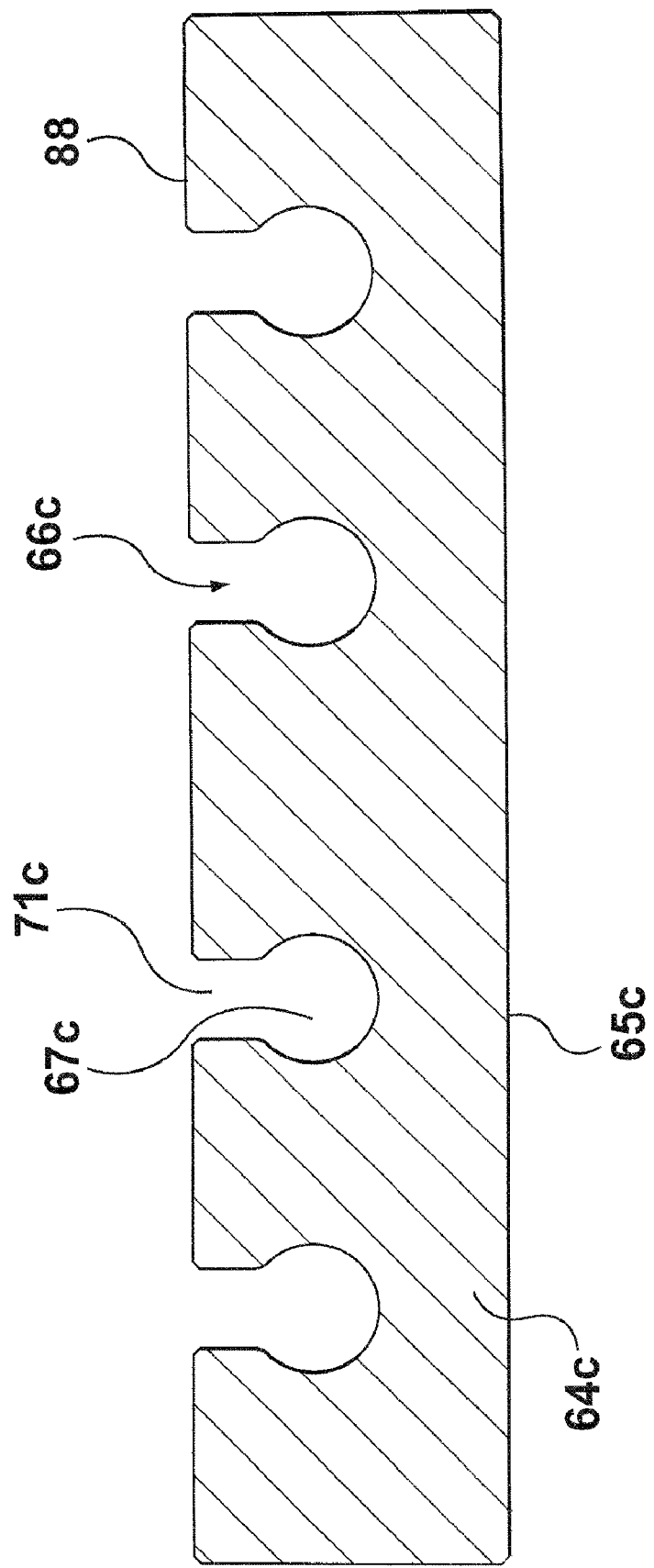
FIG. 10 is a cross-section along line 10-10 of the heater plate body of FIG. 9 with the heating elements removed.

Referring to FIGS. 8-10, another embodiment of a plate heater 60*c* for a manifold is shown. Plate heater 60*c* includes a heater plate body 64*c* having channels 66*c* provided in an upper surface 88 thereof. Heating elements 90 are fully received within channels 66*c*. Similar to channels 66 of the embodiment of FIG. 5, channels 66*c* are key-shaped to include a narrowed portion 71*c* and an enlarged portion 67*c*, as shown in FIG. 10. Accordingly, heating elements 90 sit below heater plate upper surface 88 in contact with substantially the entire surface of enlarged portion 67*c* to provide for optimal heat transfer therebetween. As shown, a longitudinal length of each heating element 90 is generally arranged in a U-shape and includes an elbow 92 at one end and terminal ends 94 at an opposite end. The terminal ends 94 of each heating element 90 communicate with a power source (not shown) through a connector (not shown). Suitable materials for heater plate body 64*c* are the same as have been previously described with respect to plate heater 64 of FIGS. 1-5. In addition, the number and arrangement of the heating elements 90 and channels 66*c* depends on the amount of heat required for a particular application and is not limited to the embodiment shown in FIGS. 8-10.

End caps 96 are provided at ends 98 and 100 of the heater 60*c*. Each end cap 96 is coupled to the heater plate body 64*c* by fasteners (not shown), which extend through apertures 102. The end caps 96 are provided to distribute the heat from the exposed elbow 92 and terminal end 94 portions of the heating elements 90. The plate heater 60*c* further includes relief holes 68*c*, which are drilled at regular intervals along the length of the extruded heater plate body 64*c*. The relief holes 68*c* are provided to receive mechanical items including fasteners (not shown) for coupling the heater 60*c* to the manifold.

As shown, the plate heater 60*c* includes multiple thermocouple apertures 70*c* for receiving thermocouples (not shown). Each thermocouple is dedicated to one control zone of the plate heater 60*c*. Each control zone typically controls a maximum heater input of 15 amps. The number of control zones, and therefore thermocouples, is determined by the desired heat output for plate heater 60*c*. Heating elements 90 may be powered independently, in parallel or in series. Powering the heating elements 90 independently or in parallel provides a fail-safe, redundant arrangement for the plate heater 60*c*. In one embodiment, a parallel arrangement requires fewer control zones and therefore is less costly than independent control of each heating element 90.

Operation of the plate heater 60*c* is similar to operation of plate heaters 60, 60*a*, 60*b* of the previously described embodiments, and therefore will not be described further here.

Figure 10A:
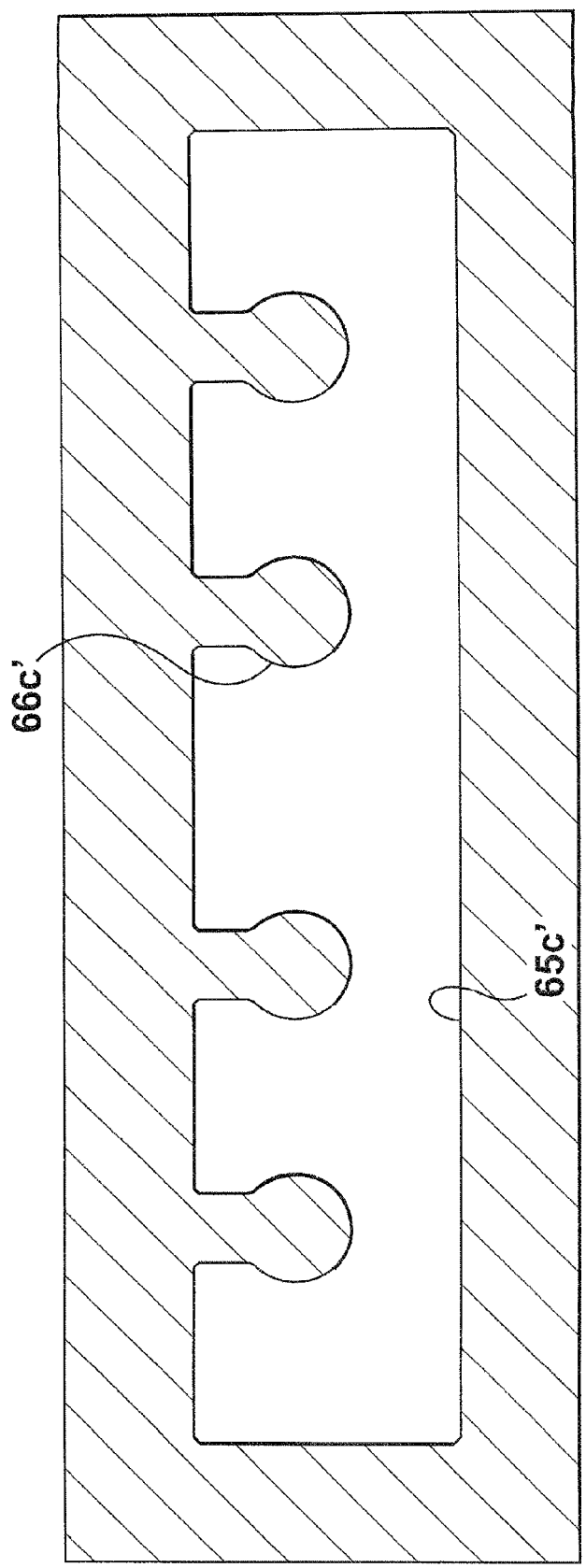
FIG. 10A is a profile of an extruder die used to produce the cross-section of the heater plate body shown in FIG. 10.

The plate heater 60*c* is produced in a similar manner as has been previously described with respect to heater 60 of FIGS. 1-5; however, the profile for the die of plate heater 60*c* differs and is shown in FIG. 10A. The profile includes a linear portion 65*c*', which corresponds to contact surface 65*c* of the heater plate body 64*c* and extended portion 66*c*', which corresponds to channel 66*c* of the heater plate body 64*c*. Following extrusion, ends 98, 100 of the heater plate body 64*c* are machined by a machining operation such as milling or grinding, for example, to accommodate the terminal ends 94 of the heating elements 90. The heating elements 90 are then positioned in the channels 66*c* and may be deformed to provide three-sided contact with its respective channel 66*c*, by a technique such as rolling a tool under pressure over the heating elements 90. In accordance with one embodiment of the present invention, the rolling or swagging operation flattens the top side of heating element 90 and maximizes the amount of contact between the remaining three-sides of heating element 90 and its respective channel 66*c*, in order to optimize the heat transfer therebetween. Other techniques for deforming the heating elements 90 may alternatively be used.

The heating elements 90 are replaceable by an operator. This provides a cost savings, as the entire plate heater 60 does not need to be scrapped and replaced when one or more heating elements fail. In various embodiments of the present invention, deformation of the heating elements 90 in the channels 66*c* makes it possible for heating elements 90 having different diameters to be installed without significantly reducing the amount of contact between the heating element 90 and the channel 66*c*. In embodiments where heating elements having smaller diameters are installed, it may be desirable to fill any gaps between the heating element 90 and the channel 66*c* with a thermally conductive paste. The thermally conductive paste does not affect the removal of the heating elements 90 from the channels 66*c* and breaks away when the heating elements 90 are removed for repair or replacement.

It will be appreciated by a person skilled in the art that by deforming the heating elements 90 into the channels 66*c*, no additional clamping plate is required so that the heating elements 90 are unenclosed.

Figure 11:
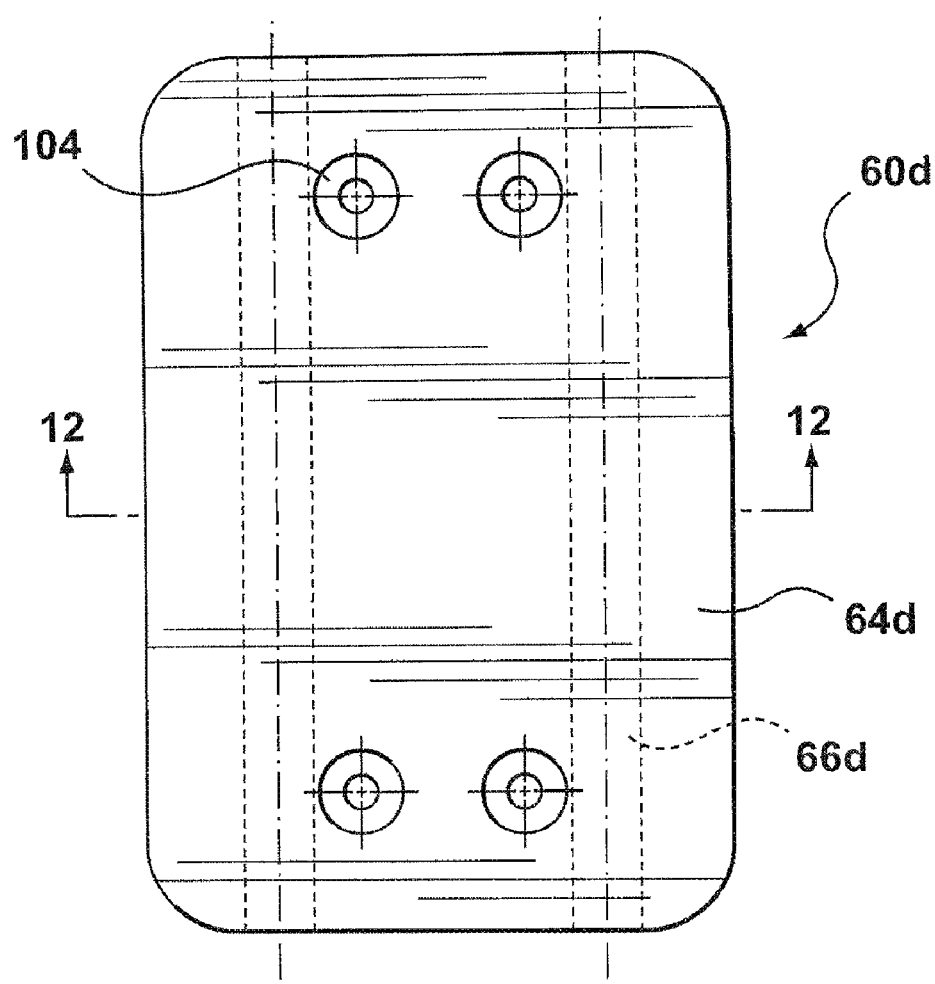
FIG. 11 is a top view of a plate heater according to another embodiment of the present invention.
Figure 12:
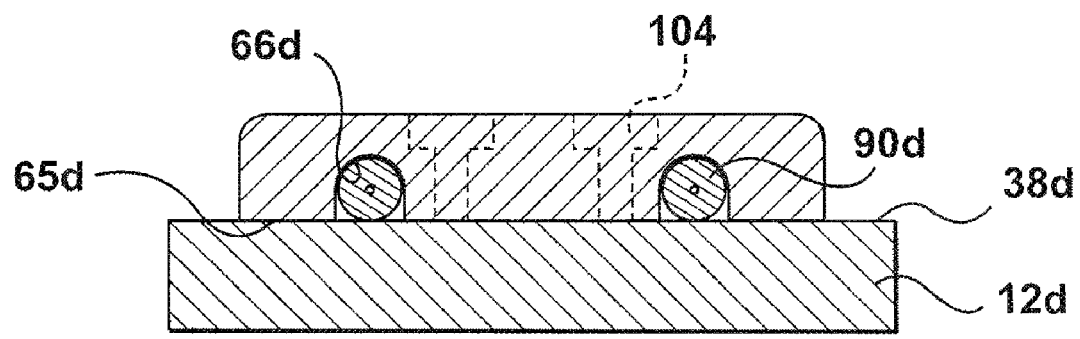
FIG. 12 is a cross-section along line 12-12 of the plate heater shown in FIG. 11.

Referring to FIGS. 11 and 12, another embodiment of a plate heater 60*d* for a manifold 12*d* is shown. In this embodiment, a heater plate body 64*d* includes a pair of channels 66*d* for receiving heating elements 90*d*. The channels 66*d* are provided in a contact surface 65*d* of the heater plate body 64*d* so that upon assembly, the heater elements 90*d* contact an upper surface 38*d* of the manifold 12*d*. This arrangement allows for direct contact between the heating elements 90*d* and the manifold 12*d*, therefore providing efficient heat transfer therebetween. A thermally conductive paste may be included to fill any gaps and increase the amount of contact between the heating element 90*d* and the both the channel 66*d* and the manifold 12*d*. Apertures 104 are provided for receiving fasteners (not shown) to fix the plate heater 60*d* to the manifold 12*d* and clamp the heating elements 90*d* to the upper surface 38*d*.

Although plate heater 60*d* is shown coupled to the upper surface 38*d* of the manifold, it will be appreciated that similar to the previous heater embodiments, the plate heater 60*d* may be coupled to any surface of the manifold 12*d*. Further, one channel 66*d* or a plurality of channels 66*d* may be provided depending on the amount of heat required for a particular application.

The heater plate body 64*d* may be formed by an extrusion process or a combination of extrusion and machining. The heater plate body 64*d* is made of a suitable material such as those materials previously described with respect to plate heater 60 of FIGS. 1-5.

Figure 13:
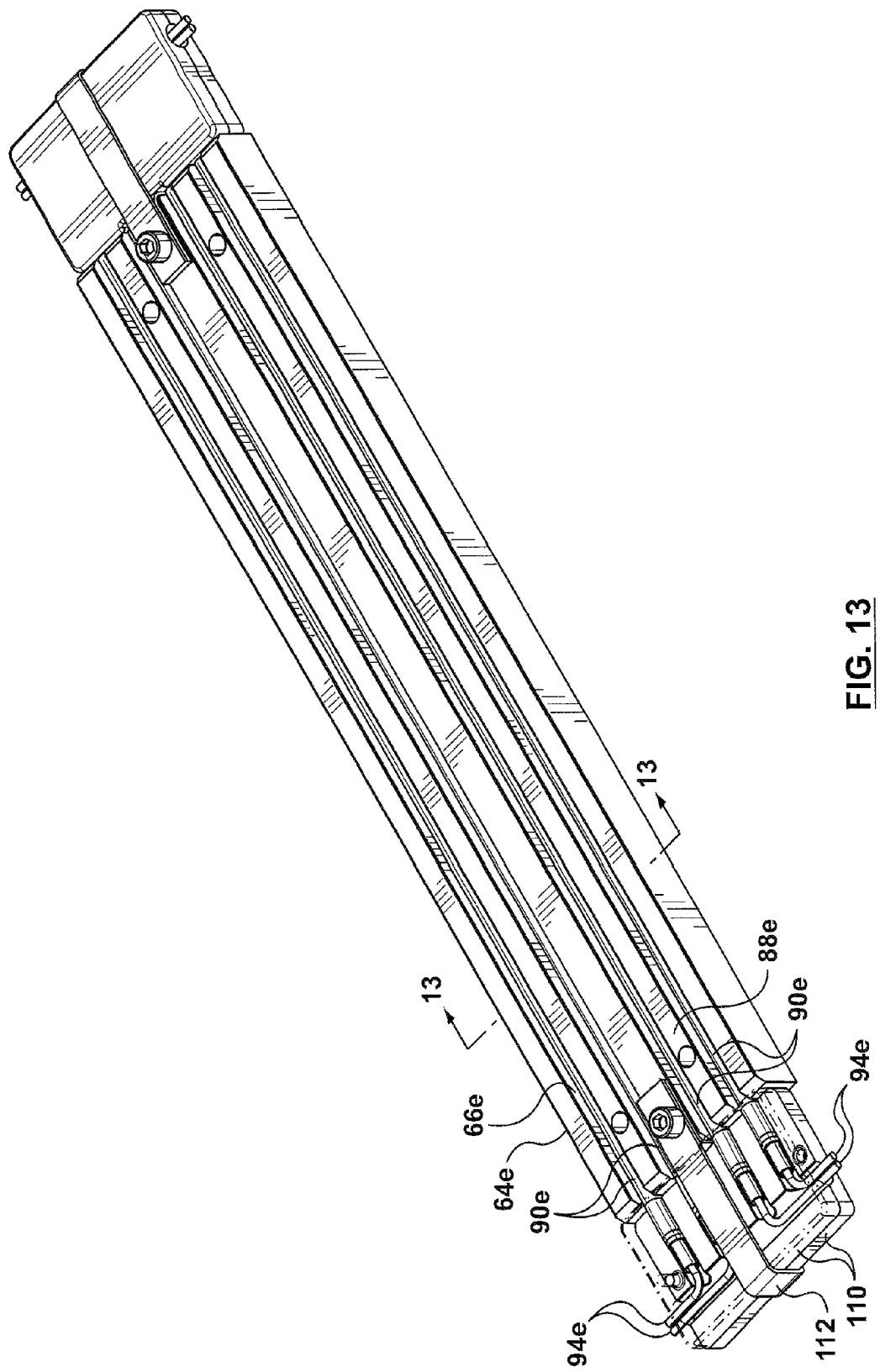
FIG. 13 is a perspective view of a plate heater according to another embodiment of the present invention.
Figure 13A:
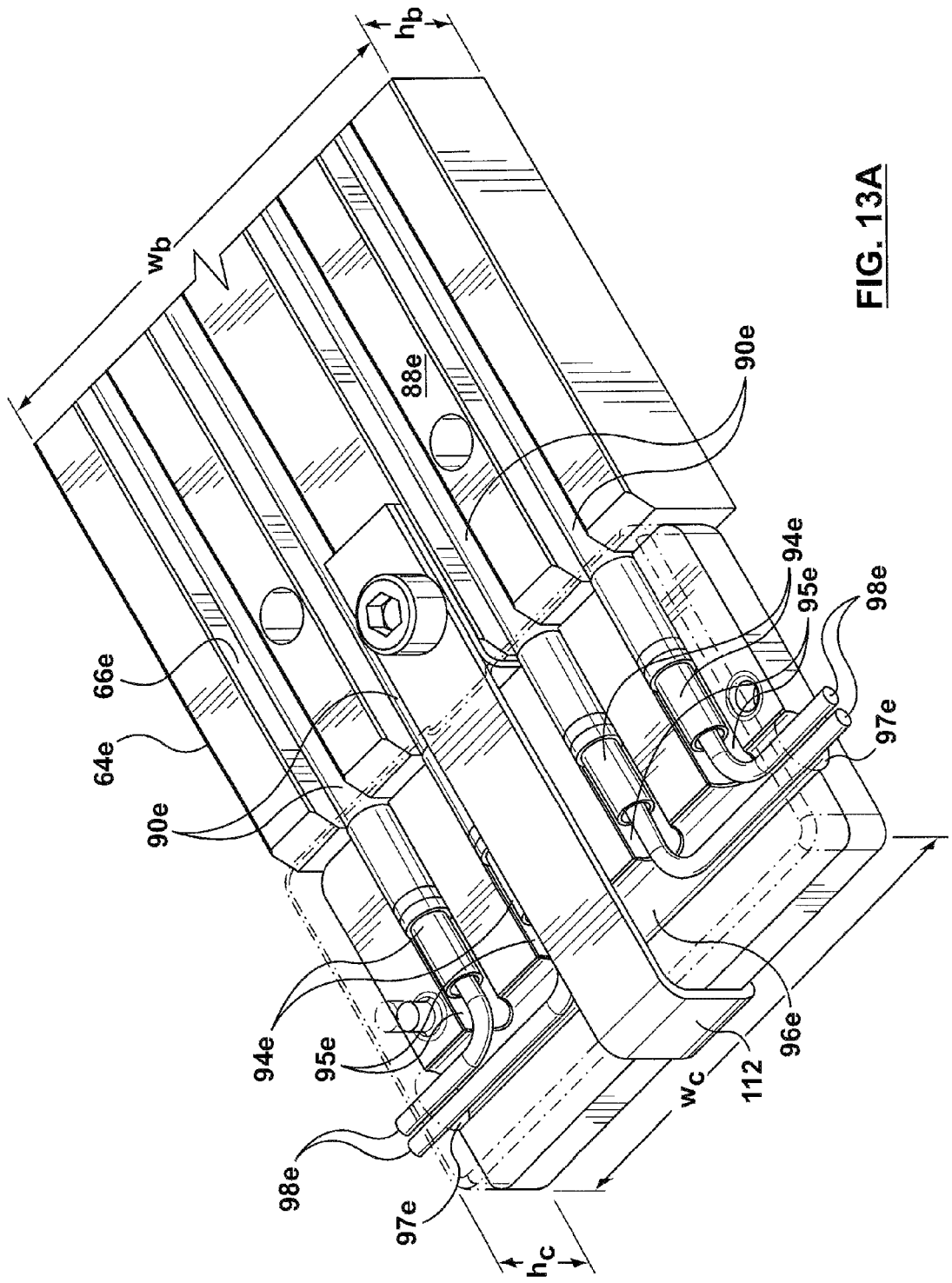
FIG. 13A is an isometric view of a portion of the plate heater shown in FIG. 13.

Another embodiment of the present invention is shown in FIGS. 13 and 13A. Plate heater 60*e* includes an extruded heater plate body 64*e* having four channels 66*e* for receiving four heating elements 90*e* in an upper surface 88*e* thereof. Although four channels and heating elements are shown, a fewer or greater number may be employed without departing from the scope of the present invention. Channels 66*e* and heating elements 90*e* extend the length of heater plate 64*e* in parallel with each other. In contrast to the embodiment shown in cross-section in FIG. 10, channels 66*e* have a straight-walled, u-shaped cross-section sized slightly larger than heating element 90*e* with a channel depth that fully receives heating elements 90*e* therein. Accordingly, an uppermost point of heating elements 90*e* sits at or below heater plate body upper surface 88*e* in contact with the walls of channel 66*e* to provide for optimal heat transfer therebetween. Heating element 90*e* may be swaged, or otherwise pressed, into channel 66*e* to make three-sided contact with heater plate body 64*e*. In one embodiment, a top surface of heating element 90*e* may be flattened during the swaging process. Heating elements 90*e* are thus held in-place within channels 66*e* without an additional cover or clamping arrangement so that they are easily replaced if one should fail.

Figure 13B:
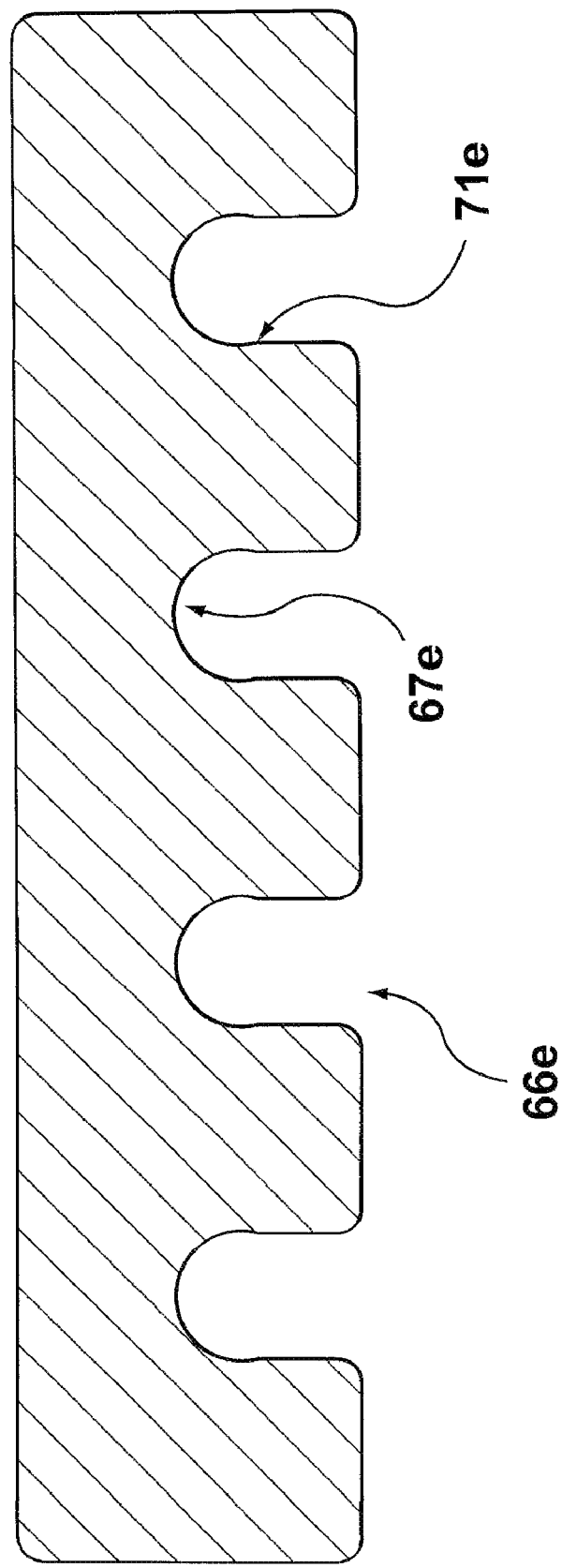
FIG. 13B is a cross-section along line 13-13 of a heater plate body in accordance with another embodiment of FIG. 13.
Figure 14:
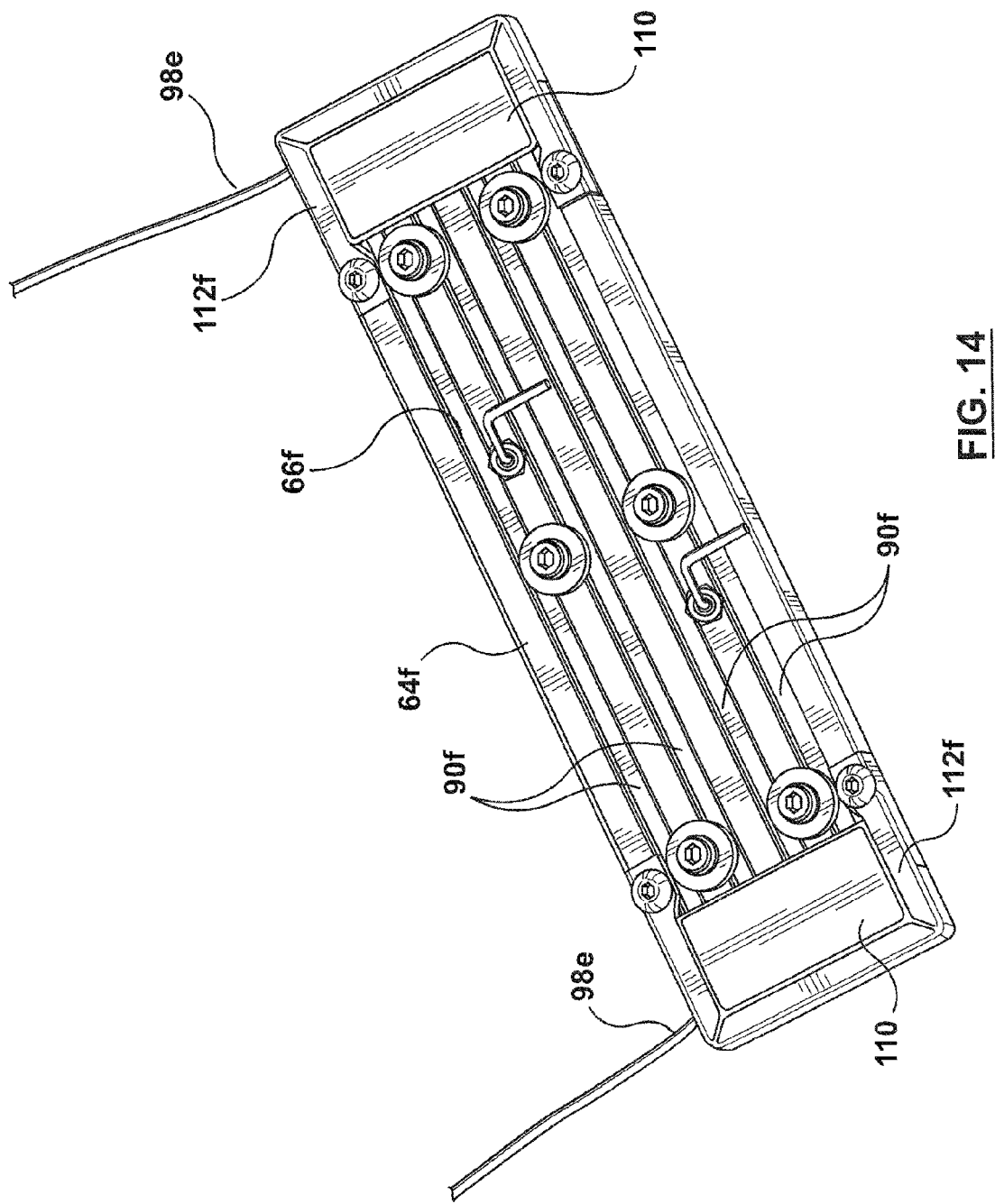
FIG. 14 is a perspective view of a plate heater according to another embodiment of the present invention.
Figure 15:
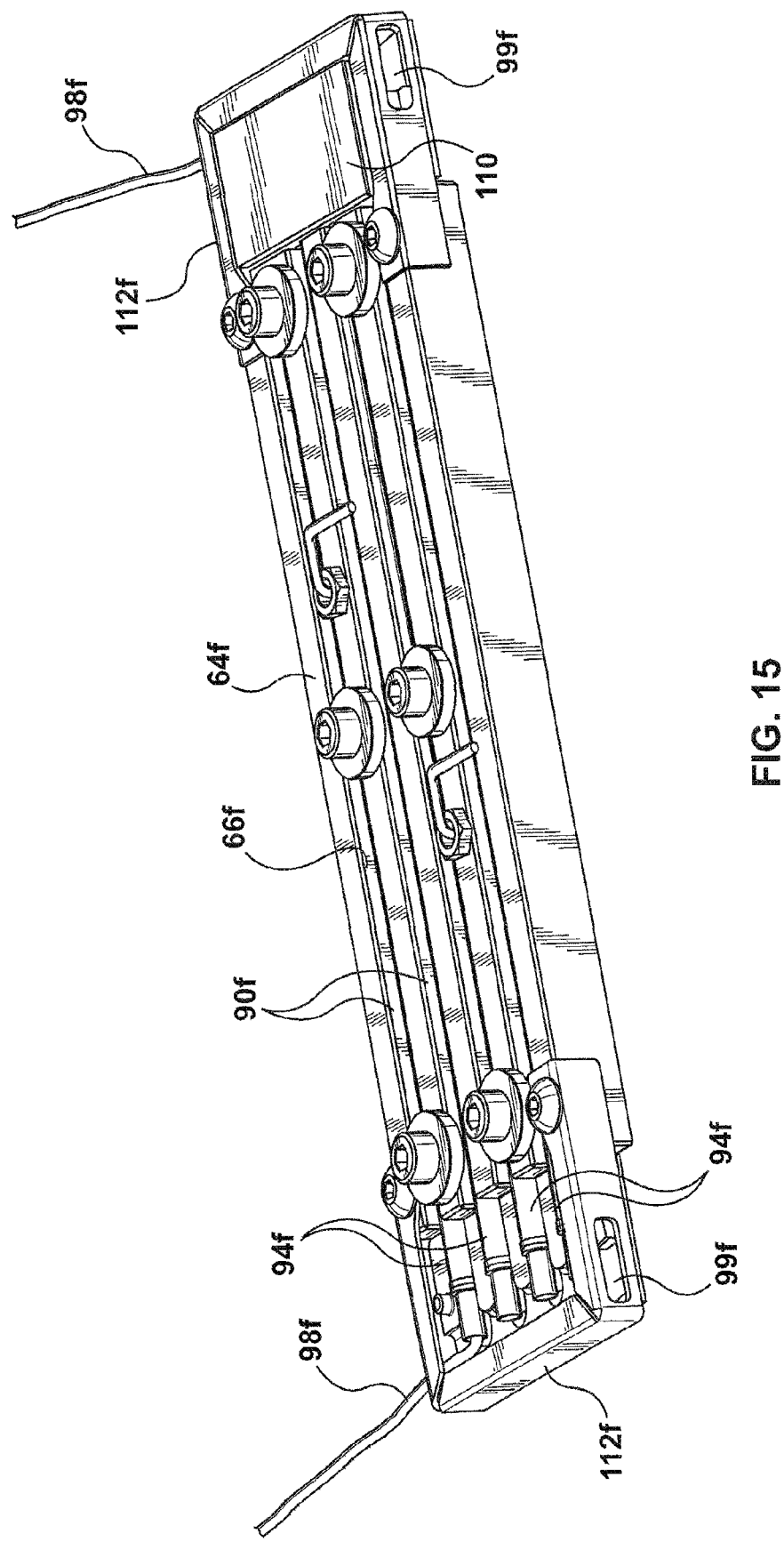
FIG. 15 is a perspective view of the plate heater shown in FIG. 14 with one end cap taken away.
Figure 16:
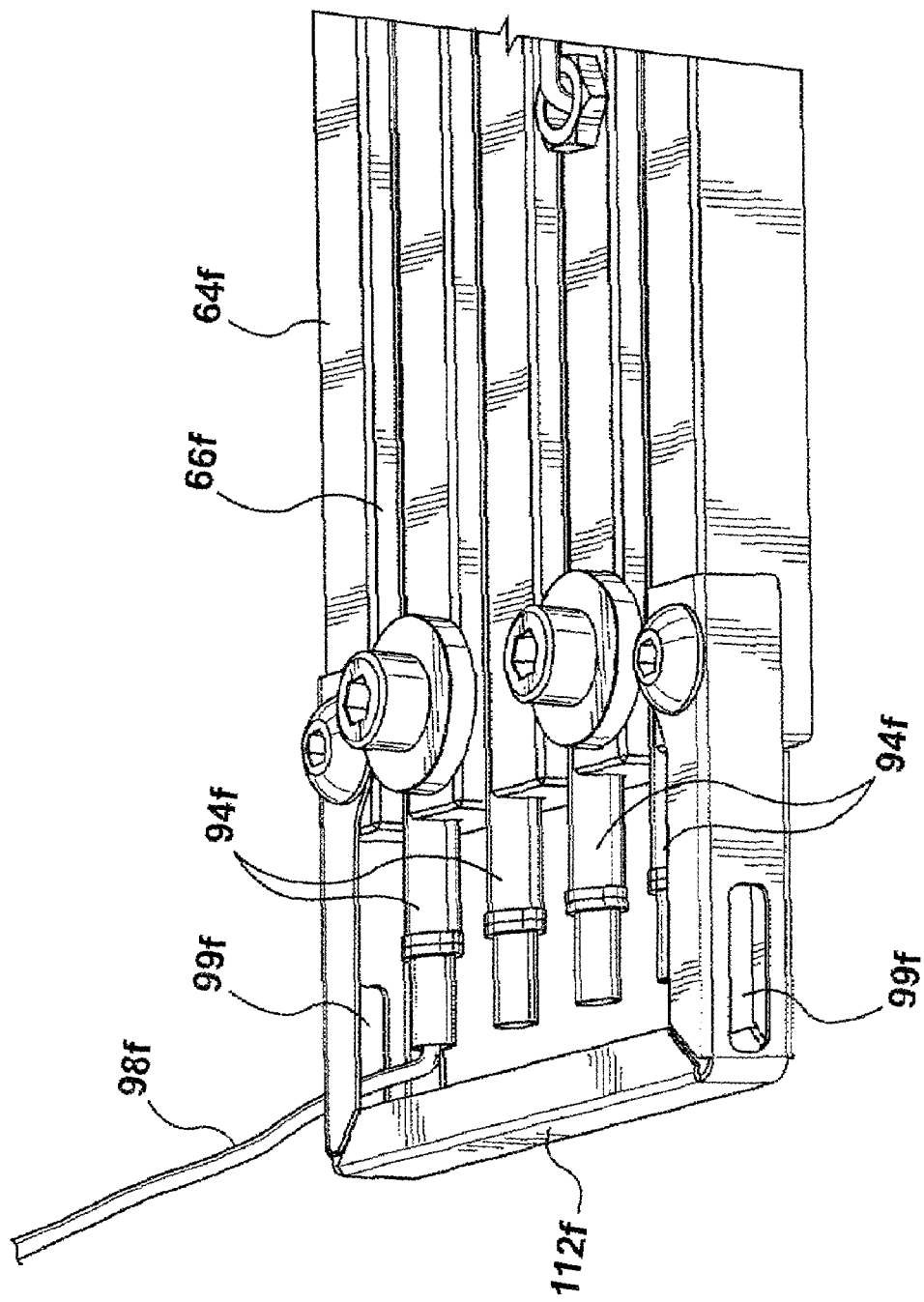
FIG. 16 is an enlarged view of the left end of the plate heater shown in FIG. 15.
Figure 17:
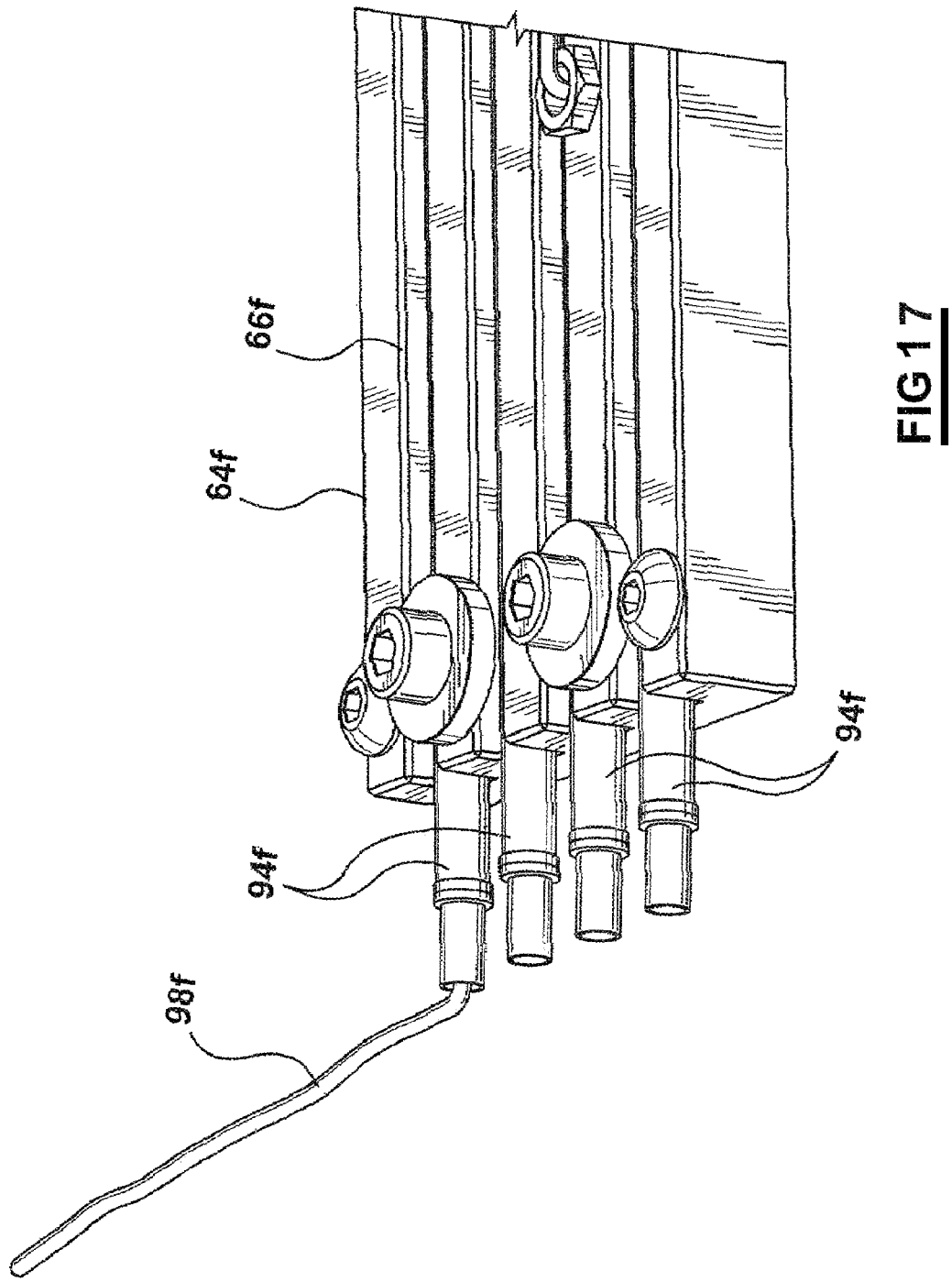
FIG. 17 is an enlarged view of the left end of the plate heater shown in FIG. 15 with the cap clamp removed.
Figure 18:
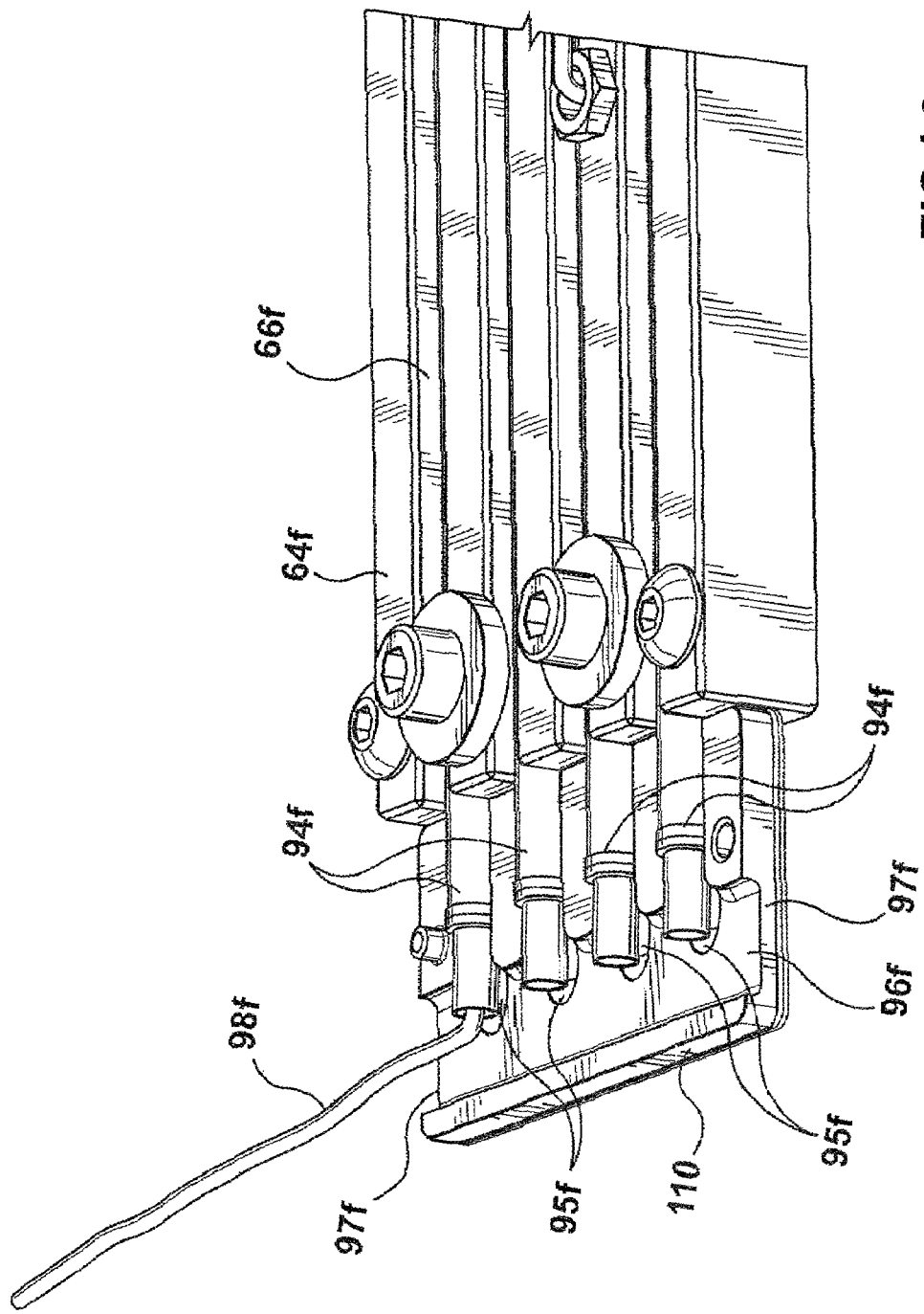
FIG. 18 is a view similar as in FIG. 17 with the lower half of the end cap attached.

In another embodiment shown in FIG. 13B which is combinable with the embodiment of FIG. 13), channels 66*e* may have a groove portion 71*e* and an undercut portion 67*e* that is a slightly enlarged area below groove 71*e*, similar to narrowed portion 71*c* and enlarged portion 67*c* shown in FIG. 10. Heating elements 90*e*, each of which has an outer diameter that is slightly larger than groove portion 71*e* but roughly equivalent to undercut portion 67*e*, are then pressed through groove portions 71*e* to sit within undercut portions 67*e* of channel 66*e*. In an embodiment, undercut portion 67*e* is sized to fully receive and to maintain contact with heating element 90*e* for maximum heat transfer therebetween. One method of making the embodiment of FIG. 13B, includes forming an undersized version of channel 66*e* during the extrusion process that forms heater plate body 64*e*, and then machining groove portion 71*e* and undercut portion 67*e* to a suitable geometry to accommodate heating element 90*e* as previously described.

Each heating element 90*e* includes terminal ends 94*e* (one of which is shown in FIG. 13A), and is connected in parallel to or wired independent of at least one other heating element 90*e*. Thus, multiple heating elements 90*e* wired in parallel or independently provide redundancy in operation for heater plate 64*e*. Terminal ends 94*e* are positioned between an upper and lower portion of a respective end cap 110, which are attached at each end of heater plate 64*e* by clamps 112. As in previous embodiments, one or more heater 60*e* may be attached to a top, side and/or bottom surface of the manifold depending on the application and heating needs. The end cap 110 comprises four inlets, each aligned with one of the channels 66*e* respectively and receiving a terminal end 94*e* of a heating element 90*e*. The upper and lower portion of the end cap 110 each including a half of four inlet channels 95*e* for receiving a straight portion of the terminal ends 94*e*. The inlet channels 95*e* intersecting a through channel 96*e* for receiving bent end portions of the terminal ends 94*e*. The through channel 96*e* having two outlets 97*e* from which the connecting ends 98*e* of the terminal ends 94*e* project. The upper and the lower portion of the end 110 each including a half of the through channel 96*e*. The end cap 110 is made out of an electrically insulative material that can withstand molding temperatures, preferably a ceramic material.

The end cap 110 is shaped like an extension of the heater plate body 64*e* and the height $h_c$ and the width $w_c$ of the end cap 110 are equal or smaller than the height $h_b$ and the width $w_b$ of the heater plate body 64*e*. Due to the fact that not only a straight portion, but also a bent portion of the terminal ends 94*e* are positioned in the end cap 110 forces applied to the connecting ends 98*e* do not influence the connection of the heating element 90*e* in the channels 66*e*. As with the embodiment shown in FIG. 9 such an end cap 110 could also position not only terminal ends 94*e*, but also the combination of terminal ends 94*e* and a conventional bend (like elbow 92 in FIG. 9) or only such conventional bends. The two halves of the end cap 110 are identical and having respective connecting means to be fitted together.

With regard to the materials of the heater plate body 64e, the arrangements of heating elements and their electrical connection etc. it is referred to the above embodiments. These features and techniques are also applicable here.

Another embodiment of the present invention is shown in FIG. 14-18. This embodiment is similar to the embodiment disclosed in FIG. 13-13B. Thus, only the differences are explained in the following. With regard to the remaining features and aspects it is therefore referred to the above.

This embodiment also includes end caps 110 on both ends of the plate heater 60f. The height $h_c$ of the end cap 110 is smaller than the height $h_b$ of the heater plate body 64f. Each end cap 110 is connected to the end of the heater plate body 64f by using a U-shaped clamp 112f. Whereas the side face of the end cap 110 including the inlets is pressed against the end face of the heater plate body 64f the three other side faces of the end cap 110 are held in the framelike structure of the U-shaped clamp 112f. The clamp 112f does not only have an overall U-shape, but also a U-shape cross-section. So that the end cap 110 can be inserted in this framelike structure provided by clamp 112f. The legs of the U-shaped clamp 112f are bolted to the heater plate body 64f. The clamp 112f does have side windows 99f being in alignment with the outlets 97f of the end cap 110 so that the connecting ends 98f projecting out of the windows 99f respectively. The clamp 112f is preferably made from a steel material.

End caps 110 as described with some of the above embodiments can be used with all of the heater designs disclosed.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

The invention claimed is:

1. An injection molding apparatus comprising:
    a manifold having a manifold channel, the manifold channel receiving a melt stream of moldable material from a source;
    a nozzle coupled to the manifold, the nozzle having a channel for receiving the melt stream from the manifold channel;
    a plate heater coupled to the manifold, the plate heater including a heater plate body and at least one heating element, wherein a surface of the heater plate body has at least one channel therein in which the at least one heating element is received; and
    at least one end cap for commonly fixing a terminal end of the at least one heating element relative to the heater plate body.

2. The injection molding apparatus of claim 1, wherein the at least one end cap is attached to the heater plate body.

3. The injection molding apparatus of claim 1, wherein the terminal end of the at least one heater element comprises a straight portion substantially in alignment with a main body of the heater and a bent portion, wherein both the straight portion and the bent portion are covered by the at least one end cap.

4. The injection molding apparatus of claim 1, wherein the at least one end cap having an end face abutting an end face of the heater plate body and a side face in an angle thereto, the end face having at least one inlet being in alignment with the at least one channel and the side face having an outlet providing access to the terminal end of the at least one heating element.

5. The injection molding apparatus of claim 3, wherein the at least one end cap has a groove formed therein to receive the terminal end portions of the at least one heating element.

6. The injection molding apparatus of claim 3, wherein the end cap includes two halves mated together, the two halves together house the terminal end portions of the at least one heating element.

7. The injection molding apparatus of claim 1, wherein the end cap rests on an extension of the heater plate body, the extension having a reduced height with regard to the overall height of the heater plate body.

8. The injection molding apparatus of claim 1, wherein the end cap is made of an insulative material.

9. The injection molding apparatus of claim 8, wherein the end cap is made of ceramic.

10. The injection molding apparatus of claim 1, wherein the heater plate body is made from an extruded metal plate having at least one straight longitudinal channel therein for receiving the at least one heating element therein.

11. The injection molding apparatus of claim 1, wherein the depth of the at least one channel is equal to or larger than the height of the at least one heating element for fully receiving the heating element within the channel.

12. The injection molding apparatus of claim 1, wherein the heater plate body has a planar contact face on a first side that is in abutment with the surface of the manifold with the surface of the heater plate body including the at least one channel on a second side, whereby the at least one channel is open toward the surface on the second side.

13. The injection molding apparatus of claim 1, wherein the heater plate body includes a flange, wherein the flange is clamped around the at least one heating element.

14. The injection molding apparatus of claim 13, wherein the heater plate body also includes a base and fasteners and the flange is fastened to the base by the fasteners to provide a clamping force around the at least one heating element to retain the heating element in the channel.

15. The injection molding apparatus of claim 1, wherein the at least one channel is provided in a contact surface that is in abutment with the surface of the manifold and the heating element contacts the surface of the manifold.

16. The injection molding apparatus of claim 1 including at least two heating elements that are powered independently.

17. The injection molding apparatus of claim 16, wherein the two heating elements are powered in series.

18. The injection molding apparatus of claim 16, wherein the two heating elements are powered in parallel.

19. The injection molding apparatus of claim 1, wherein the heater plate body includes at least two heating elements and the surface of the heater plate body includes two channels therein, wherein each of the heating elements is received within a respective channel.

20. The injection molding apparatus of claim 19, wherein the at least one end cap fixes the terminal ends of the two heating elements relative to the heater plate body.

* * * * *